United States Patent [19]

Haka

[11] Patent Number: 5,234,090
[45] Date of Patent: Aug. 10, 1993

[54] CLEARANCE ADJUSTMENT FOR A MULTI-PLATE FLUID OPERATED FRICTION CLUTCH

[75] Inventor: Raymond J. Haka, Rochester, Mich.

[73] Assignee: General Motors Corporation, Detroit, Mich.

[21] Appl. No.: 947,617

[22] Filed: Sep. 21, 1992

[51] Int. Cl.$^5$ .................... F16D 13/75; F16D 25/08
[52] U.S. Cl. ................... 192/70.25; 192/85 CA; 192/111 A; 188/196 P
[58] Field of Search ........... 192/70.25, 85 CA, 111 A; 188/71.8, 196 P

[56] References Cited

U.S. PATENT DOCUMENTS

| | | | |
|---|---|---|---|
| 2,965,207 | 12/1960 | Snyder | 192/111 A |
| 3,566,997 | 3/1971 | Heck | 188/71.8 X |
| 3,857,468 | 12/1974 | Iritono et al. | 188/196 P X |

*Primary Examiner*—Richard M. Lorence
*Attorney, Agent, or Firm*—Donald F. Scherer

[57] ABSTRACT

A fluid operated friction clutch has a power piston which is selectively pressurized to urge a presser plate into abutment with a clutch disc pack to enforce frictional engagement thereof. The presser plate has an inner annular surface which is axially aligned with an adjuster sleeve which frictionally engages a clutch hub. The adjuster sleeve has a plurality of fingers or tangs which engage the presser plate to enforce relative movement between the sleeve and the hub until full engagement of the clutch pack is attained. The sleeve also has a lip or tang which limits the retraction of the presser plate from the clutch engaged position thereby establishing the free-running clearance of the clutch pack.

1 Claim, 2 Drawing Sheets 5,234,090

CLEARANCE ADJUSTMENT FOR A MULTI-PLATE FLUID OPERATED FRICTION CLUTCH

TECHNICAL FIELD

This invention relates to piston stroke adjusters for fluid operated friction devices, and more particularly, to piston stroke adjusters which maintain a substantially constant free-running clearance in a clutch or brake.

BACKGROUND OF THE INVENTION

Fluid operated multi-plate friction devices generally have a disc pack consisting of one set of friction plates drivingly connected to a first member, such as a hub, and another set of friction plates alternately spaced of the first set drivingly connected to another member, such as a housing. The friction device is engaged by a fluid operated piston which causes frictional torque transmission between the members through the alternately spaced friction plates.

When the device is initially brought into engagement, a speed differential is present between the friction plate members which can result in some wear. The wear will result in increased free-running clearance in the device and therefore increased engagement time. While this slight change in engagement timing is not detrimental, it can be perceptible and requires, at least in electronic controls, that some control adjustments be made.

SUMMARY OF THE INVENTION

The present invention seeks to overcome the change in free-running clearance during clutch life by providing a control mechanism which will establish a constant free-running clearance within the friction device.

A mechanism is operable to control the distance that the engagement piston will travel between a fully engaged and full disengaged position. This is accomplished by a sleeve member which frictionally engages a hub. The sleeve responds to the engagement piston by moving relative to the hub until full engagement is established, after which, the frictional connection between the sleeve and the hub maintains this position until further adjustment is required.

The sleeve has a lip portion which limits the distance the clutch piston travels from the fully engaged to the fully disengaged positions. This travel distance is the free-running clearance for the friction device and will remain constant throughout the life of the friction device.

It is therefore an object of this invention to provide an improved clutch adjustment mechanism for a multi-plate fluid operated clutch assembly.

It is another object of this invention to provide an improved adjustment mechanism for a fluid operated friction torque transmitting device, wherein a presser plate is limited in the released condition by a member which is positionable by the presser plate in the engaged position, thereby establishing a constant travel distance between the engaged and disengaged positions.

These and other objects and advantages of the present invention will be more apparent from the following specification and drawings

DESCRIPTION OF THE EXEMPLARY EMBODIMENT

Figure 1:
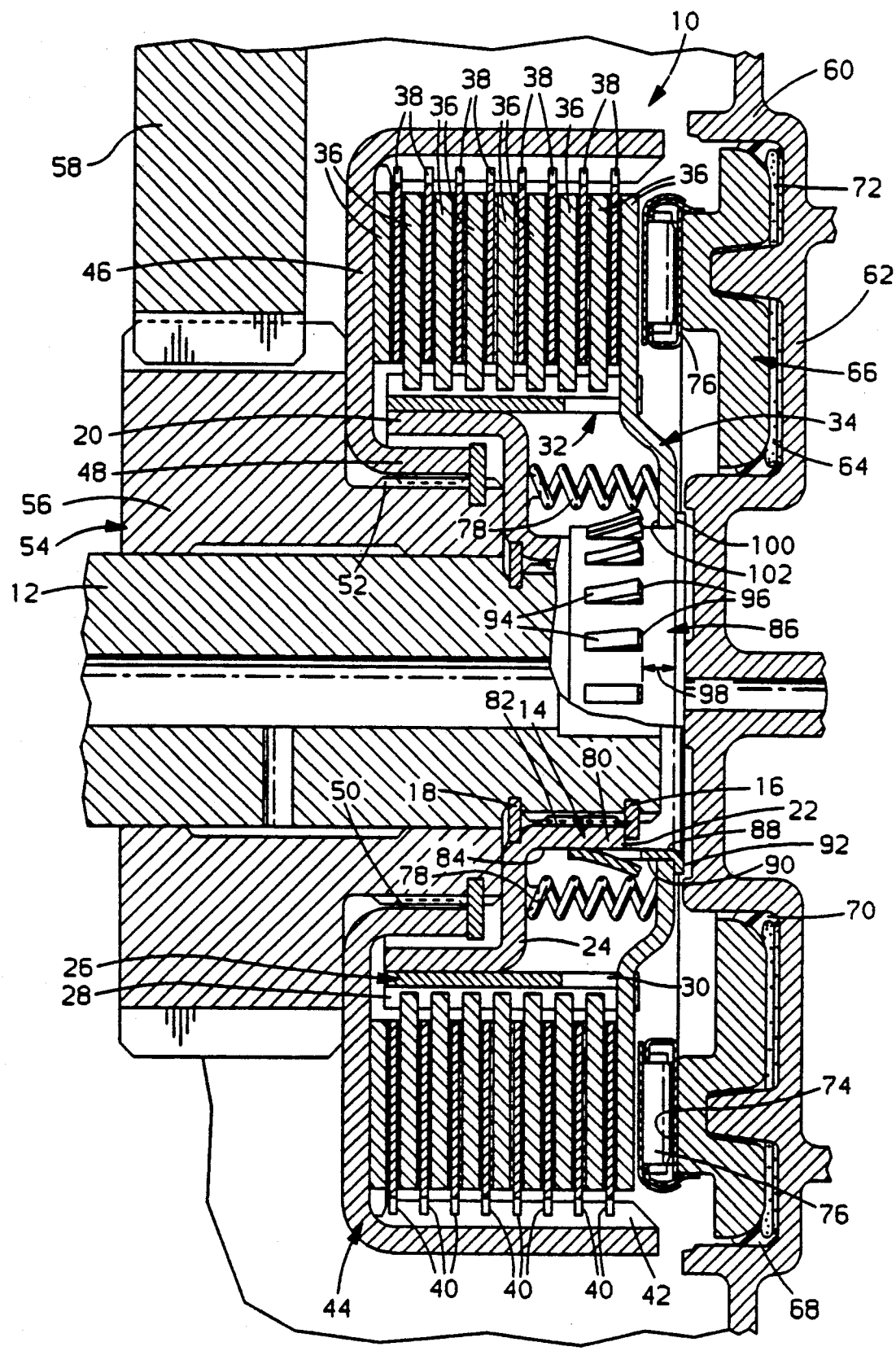
FIG. 1 is a cross-sectional elevational view of a clutch assembly incorporating the present invention.

Referring to the drawings, and particularly FIG. 1, there is seen a clutch assembly, generally designated 10, having an input shaft 12 having a hub 14 splined thereto. The hub 14 is limited in rightward movement on the shaft 12 by a locking ring 16 and leftward movement by a locking ring 18. The hub is essentially Z-shaped or S-shaped in cross section such that an outer hub wall portion 20 is presented substantially parallel to a portion of the shaft 12. In the alternative, the hub 14 can be press fit to the shaft 12, or other conventional locking means can be used.

The wall portion 20 is connected to an inner portion 22 by a radial wall 24. The outer portion 20 has secured or otherwise bonded thereto an axially extending annular sheet metal ring 26 which has a spline 28 formed therein. The sheet metal ring 26 also has a plurality of fingers 30 formed thereon by the removal of portions of the metal forming the ring 26. These fingers 30 cooperate to define slots 32 in which a presser plate 34 is slidably engaged. A plurality of plates 36 are mounted on the ring 26 by an interior splined area which is complementary to the spline 28.

A plurality of friction plates 38 are alternately spaced with the plates 36. Each friction plate 38 has an outer periphery 40 in which a toothed area is defined. The toothed area is disposed in meshing relationship with a spline 42 formed in an annular sheet metal housing 44. The friction plates 36 and 38 cooperate to form a conventional clutch pack. The annular sheet metal housing 44 has an end wall 46 and an inner axially extending wall 48 having a spline 50 formed thereon. The spline 50 is disposed in meshing relationship with a spline 52 formed on a hub 54 of a conventional gear member 56. The gear member 56 is rotatably mounted on the shaft 12, such that relative rotation therebetween can occur. The gear 56 meshes with a gear 58 disposed on a countershaft, not shown, and is operable to transmit drive forces from the shaft 12 to the countershaft.

The clutch 10 and the gears 56 and 58 are disposed in a housing or casing 60 having an end wall 62 in which is formed an annular chamber 64. An annular piston 66 is slidably disposed within the chamber 64. A pair of annular elastomeric lip seals 68 and 70 are bonded or otherwise secured with the annular piston 66, such that a fluid tight chamber 72 is formed by the piston 66 and a portion of the chamber 64. The piston 66 has an annular engagement face 74 which is disposed in abutment with one side of a caged needle or roller bearing 76. The other side of the bearing 76 is disposed for rotation with the presser plate 34.

During operation of the clutch 10, the chamber 72 is pressurized in a conventional manner thereby urging the piston 66 leftward such that the presser plate 34 will move axially thereby enforcing frictional engagement between the adjacent faces of the plates 36 and 38. When sufficient force is applied via the piston 66 to the presser plate 34, torque will be transmitted from the shaft 12 to the gear 56 via the clutch assembly 10. When the fluid pressure in the chamber 72 is exhausted, the presser plate 34, and therefore piston 66, will be urged rightward to a disengaged position by the force of a plurality of coil springs 78.

Figure 2:
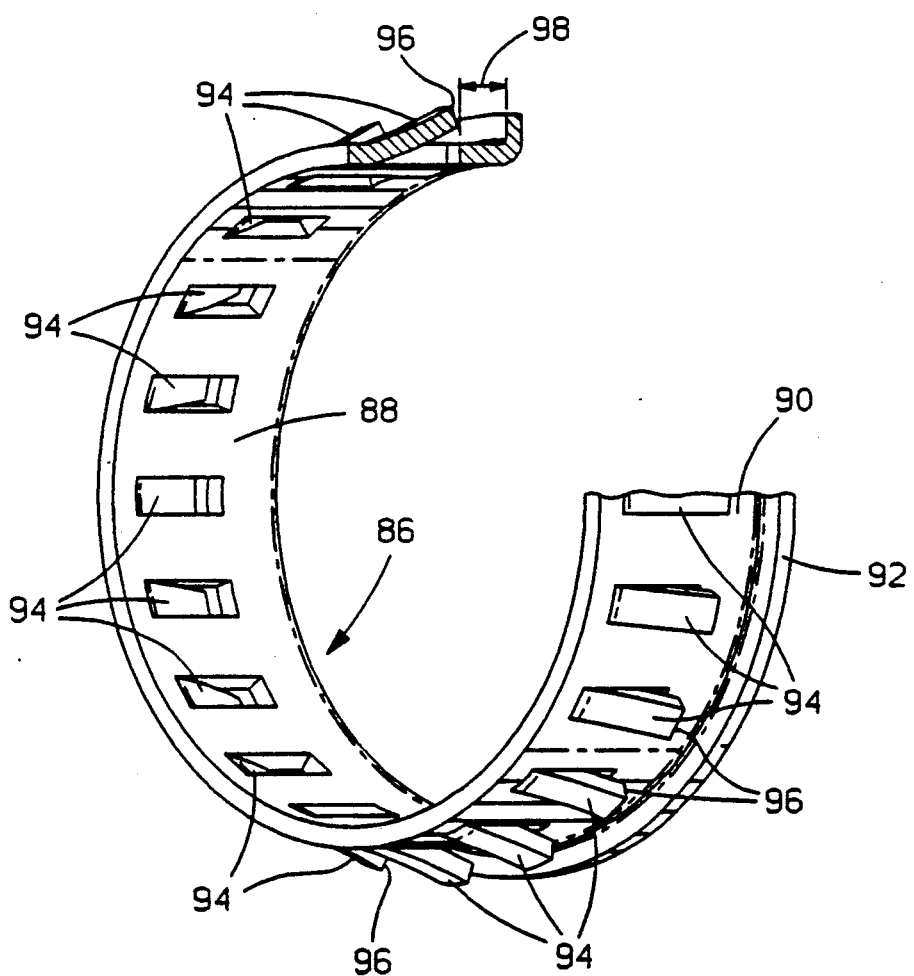
FIG. 2 is a perspective view of a portion of the mechanism shown in FIG. 1.

The hub 14 has an axially extending portion 80 on which a spline 82 is formed to provide the drive connection between the shaft 12 and the hub 14. The axially extending portion 80 has an outer surface 84 on which is frictionally mounted an adjuster sleeve 86. As best seen in FIG. 2, the adjuster sleeve 86 has an interior wall 88 which frictionally engages the surface 84 and an exterior wall 90. The adjuster sleeve 86 has an upstanding lip or tang 92 which extends radially outward from one end of the wall 90.

The adjuster sleeve 86 also has a plurality of fingers or tangs 94 which are comprised of metal displaced outwardly from the walls 88 and 90. The fingers 94 each have a end surface 96 which are disposed a predetermined distance 98 from the lip 92.

As best seen in FIG. 1, the presser plate 34 has an inner annular wall portion 100 which, in the piston retracted position shown, abuts the surface of the lip 92. This mechanism establishes the disengaged position of the piston 66. In this position, the plates 36 and 38 are free to rotate relative to each other. This is the free-running or open running condition of the clutch 10. When the piston 66 is pressurized by fluid in chamber 72, as previously described, the presser plate 34 is moved leftward and will be disposed in abutment with the ends 96 of the fingers 94.

If the clutch 10 is not fully engaged when the presser plate 34 engages the ends 96, the sleeve 86 will be moved axially along the surface 84 with the presser plate 34 until the clutch is fully engaged. Thus, the position of sleeve 86 in hub 14 is established, such that the distance between the free-running condition and the fully engaged clearance is controlled by the distance 98 between the lip 92 and the ends 96 of the fingers 94.

The actual free-running clearance of the clutch is determined by the distance between an annular inner wall 102 of the presser plate 34 and the ends 96 of the fingers 94. The desired amount of free-running clearance utilized in a friction device is at least partially determined by the number of friction interfaces that are present in the clutch assembly.

As shown in the clutch 10 of FIG. 1, there are sixteen friction interfaces. If each of these interfaces requires 0.004 inches of running clearance, the total free-running clearance will be 0.064. This free-running dimension is easily controlled by the thickness of the lip 92, the positioning of the ends 96 of the fingers 94 and the thickness or distance between the walls 100 and 102 of the presser plate 34.

While in most assemblies a friction connection between the sleeve 86 and the surface 84 will be sufficient to establish the disengaged position of the presser plate 34, it is possible to use other interfaces between the interior wall 88 and the surface 84. For example, a tooth interface could be provided wherein circumferential teeth would be formed on both the interior surface 88 and the surface 84, such that the interlocking of these teeth would withstand the spring force in the disengaged position of the presser plate 34 but would be movable relative to each other to establish the initial engaged position and thereafter move axially as necessary to compensate for changes in the axial length of the clutch assembly.

The springs 78 establish the maximum force present on the sleeve 86 when the piston 66 is in the disengaged condition. It is this spring force that must be withstood by the interface between the sleeve 86 and the surface 84. Those skilled in the art will recognize that various configurations of the mating faces of these components can be utilized to achieve the desired retention force.

The embodiments of the invention in which an exclusive property or privilege is claimed and defined as follows:

1. A fluid operated friction drive establishing assembly having a free-funning clearance adjustment mechanism comprising:

a housing having an axially extending splined interior wall portion;

a plurality of first friction discs drivingly connected with the splined interior wall portion;

a plurality of second friction discs alternately spaced with the first friction discs and each second friction disc having drive connecting means;

shaft means disposed concentric with the housing having drive means thereon disposed in drive relation with the drive connecting means;

fluid operated piston means including a presser plate disposed for axial movement for selectively enforcing frictional engagement between the first and second friction discs;

spring means for urging the piston means to a release position wherein the first and second friction discs have a free-running clearance therebetween; and adjusting means for controlling the free-running clearance comprising a sleeve member disposed in frictional abutment with the shaft means, first tang means disposed on the sleeve for engagement by said piston means during enforcement of frictional engagement and second tang means spaced axially from said first tang means on the sleeve for abutment by said piston means during urging by said spring means to a disengaged position to define the free-running clearance of the fluid operated friction drive establishing assembly.

* * * * *